United States Patent [19]

Servel et al.

[11] Patent Number: 4,594,708
[45] Date of Patent: Jun. 10, 1986

[54] SYNCHRONIZATION FOR A DIGITAL TRAIN INTENDED FOR A CORRECT FRAMING OF RECEIVED INFORMATION

[76] Inventors: Michel Servel, Le Rhu en Servel; Alain Thomas, Cosmos, Bâtiment E, both of 22300 Lannion, France

[21] Appl. No.: 540,790

[22] Filed: Oct. 11, 1983

[30] Foreign Application Priority Data

Oct. 21, 1982 [FR] France .................. 82 18123

[51] Int. Cl.⁴ .......................................... H04J 3/26
[52] U.S. Cl. ................................. 370/94; 370/100; 370/99
[58] Field of Search ............... 370/94, 60, 92, 100, 370/99, 85

[56] References Cited

U.S. PATENT DOCUMENTS

| | | | |
|---|---|---|---|
| 4,071,706 | 1/1978 | Warren | 370/94 |
| 4,096,355 | 6/1978 | Rothauser et al. | 370/94 |
| 4,154,983 | 5/1979 | Pedersen | 370/94 |
| 4,317,197 | 2/1982 | Ulug | 370/94 |
| 4,482,999 | 11/1984 | Janson et al. | 370/60 |

FOREIGN PATENT DOCUMENTS 0023331 2/1981 European Pat. Off. ............ 370/94

OTHER PUBLICATIONS

"A Subscriber Loop Multiplexing System for Integrated Service Digital Networks", by Motoyama et al., IEEE 1981, National Telecommunications Conf. Innovative Telecommunications-Key to the Future, New Orleans, La.; 29 Nov.-Dec. 3, 1981.

Primary Examiner—Douglas W. Olms
Attorney, Agent, or Firm—Laff, Whitesel, Conte & Saret

[57] ABSTRACT

A digital train is synchronized to correct the framing of received information. To this end, the transmitted digital train is timely structured into recurrent time intervals having a fixed length. The information to be transmitted is divided into blocks called packets, having the length of a time interval and comprising a field of data and a header used for identifying the packets. A digital transmission system with a TDM multiplex is divided into equal and recurrent time intervals, wherein the information is indexed by an associated explicit header, and wherein the absence of information in a time interval is indexed by a specific header which is not used elsewhere as a header. The recognition of a specific address is also used for synchronizing the alignment of the time intervals.

13 Claims, 3 Drawing Figures

SYNCHRONIZATION FOR A DIGITAL TRAIN INTENDED FOR A CORRECT FRAMING OF RECEIVED INFORMATION

The present invention relates to a process of synchronization for a digital train intended for a correct framing of a received information. To this end, the transmitted digital train is timely structured into recurrent time intervals having a fixed length, and the information to be transmitted is divided into blocks called "packets", each packet has the length of a time interval and comprises a field of data, together with a header which is used for identifying the packet.

In known synchronizing systems for synchronous digital transmission, the information is structured into frames which are aligned by using a special frame alignment signal. Such an alignment leads to a pattern which, when detected, is used for framing an automaton or device that automatically controls a sequence of operations of the receiving equipment, which will thereafter expect to cyclically receive the digital transmission at the same place. In practice, the alignment pattern may also appear in the conveyed information, which forms that which is acknowledged as an alignment imitation. Such possibilities of imitation complicate the locking algorithm, which becomes more effective and reliable as the length of the alignment pattern becomes longer with respect to the length of the frame.

The known process of synchronization in digital transmission, according to the HDLC procedure, makes use of flags. The synchronization is thus insured, as well as the recognition of the information. The process comprises defining a binary entity, by means of the flag, which will not appear at any time in the information flow. The repetition of the pattern indicates the absence of information or a separation between two different information flows. In the HDLC procedure, the flag is comprised of a byte with six "1" between two "0", forming the pattern 01111110. A configuration of six successive "1"s is prohibited in the field of data which is obtained when encoding by inserting a dummy "0" each time five successive "1"s occur.

Another known process of synchronization operates responsive to a code violation. Such a procedure is similar to the previous one. However, instead of distinguishing the information from the non-information by representing the latter with flags, prohibited transmission code elements are used for identifying the non-information. In fact, a transmission code always comprises redundancies intended for detecting defective operating conditions. A number of these redundancies may be used as flags.

In case of synchronous digital transmission of the information divided into packets of fixed length, the system according to the invention has a number of advantages with respect to the known systems.

The information is conveyed in the same form as it is supplied by the packet generator without need of any handling, at the bit level, such as inserting "0"s in the HDLC procedure. Thus, it is not necessary to store the information required for allowing an insertion of the "0"s.

The code violation process has the same advantage. However, even if the process may be convenient for a newly created local network, it is quite unusable when it is intended to be used in existing transmission channels having their code well defined and optimized with respect to the transport function. Almost always, there are existing channels in the case of telecommunication networks.

As to the system according to the invention, its simplicity is remarkable since it has immunity against wrong lockings; it does not reduce the capacity of the transmission medium by adding synchronizing signals to the information, because the signals means precisely the absence of information.

According to a feature of the invention, a process of synchronization is provided for a digital transmission system with a TDM multiplex divided into equal and recurrent time intervals. The information is indexed by an associated explicit header. The absence of information in a time interval is indexed by a specific header which is not used elsewhere, as a header. The recognition of the specific address is also used for synchronizing the alignment of the time intervals.

The above mentioned and other features of the present invention will appear more clearly from the following description of a particular embodiment, the description being made in conjunction with the accompanying drawings, wherein.

Figure 1:
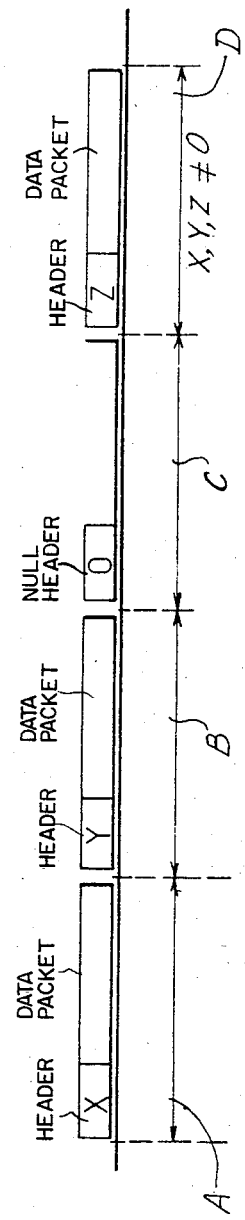
FIG. 1 is a time diagram illustrating the train of the transmitted packets, according to the invention.

In the described embodiment of the process of synchronization according to this invention, each time interval has a constant length of sixteen bytes. As shown in FIG. 1, each not-empty packet A, B or D occupies an entire time interval and comprises a header of one byte and a message part in the remaining fifteen bytes. Headers X, Y or Z identify the packets A, B or D, and, necessarily, those headers are not null. Thus, there are 255 possible values for the packet headers. The null header is assigned to the time intervals (e.g. interval C) without any information, i.e., which do not transmit a packet.

As the packets have a fixed length and are conveyed within recurrent cyclic gating times, there is no need to use flags for detecting the boundaries of the packets. It is enough to have a quite simple cyclic processing circuit, once the alignment has been obtained.

The above mentioned framing is obtained by getting alignment from "blank gating times", i.e. the time intervals (such as "C") without information which have a null header, as previously mentioned. To this end, the packet multiplex should not be used with a loading rate equal to one, so that a small part of its capacity, ranging about 1%, for example, may be assigned to the synchronization functions. A blank gating time comprises a null byte followed by 120 bits, alternating "1"s and "0"s as represented in time span C between the packets B and D (FIG. 1). Any other header and any other configuration of 120 bits may also be used, but it is obvious that the described configuration allows a use of a simple means.

In an alternative arrangement, for balancing the number of bits "0" and "1" to advantageously comply with technical transmission requirements, it is preferred to build a blank gating time with a first byte having as many "1"s as "0"s. For example, this first byte or header will be "00001111" followed by 120 alternate "0"s and "1"s, i.e. a blank gating time "000011110101010 . . . 0101."

In the receiving equipment, a synchronizing circuit has its input connected from the transmission line to allow a permanent supervision of the information flowing through the line. That circuit supplies a systematic reframing signal of the information each time the configuration corresponding to the 128 binary elements of the blank gating time has been detected in the circuit. Apart from the blank gating times, the synchronization is only ensured by a cyclic counter, the recurrence of which is the length of the time intervals. The systematic reframing on the blank gating time configuration is allowed only if the gating time has sixteen bytes and, thus, constitutes a frame locking which, statistically, will practically never be duplicated by any other signal or noise.

It will be noted that, if needed, when using a blank gating time "000000001010 . . . 10", any imitation of a blank gating may be prevented by prohibiting from the packets the following eight header values: 10101010, 01010101, 00101010, 00010101, 00001010, 00000101, 00000010 and 00000001. In this case, there is no possibility of having the synchronizing configuration astride any two consecutive packets. Obviously, the above considerations disregard the transmission errors on the line. When using the alternative blank gating time, the following header values would be prohibited: 10101010, 01010101, 11010101, 11101010, 11110101, 01111010, 00111101 and 00011110.

Figure 2:
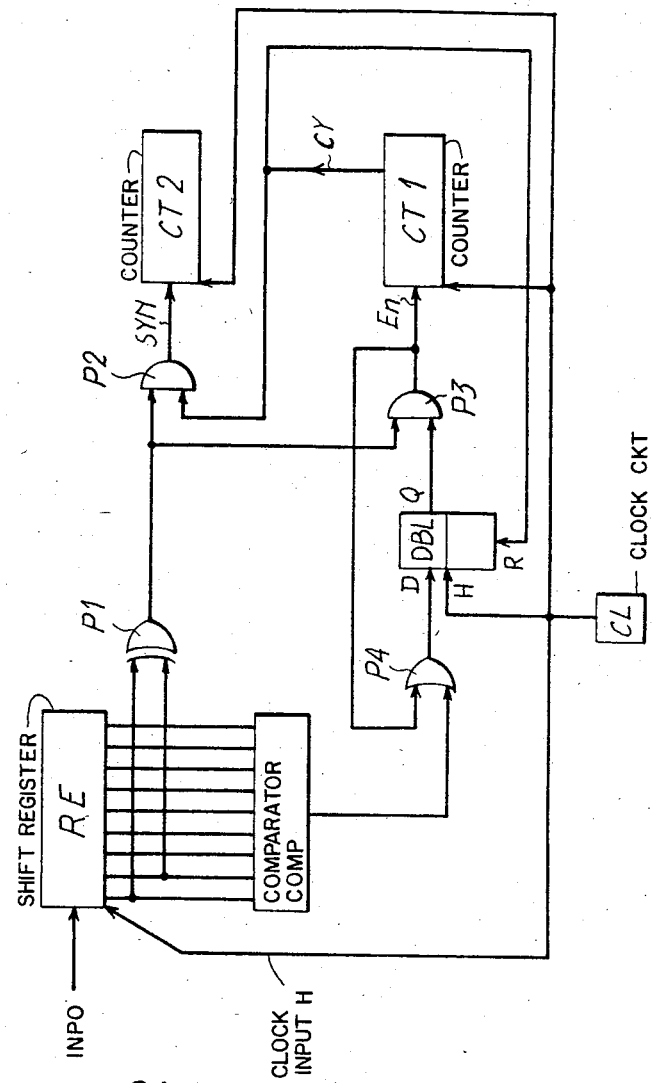
FIG. 2 is a schematic diagram of a synchronizing circuit embodying a way of synchronization according to the invention.

An embodiment of a synchronizing circuit according to the invention is shown in FIG. 2. The series input of a shift register RE is connected from the transmission line INPO. The clock input H of shift register RE is connected to a clock circuit CL for restoring the bit rate. The register RE has eight stages. Its eight bit outputs are connected to eight first parallel inputs of a comparator COMP which has eight second inputs receiving a potential corresponding to the bit "0".

Further, the parallel outputs "1" or "2" of the register RE are connected to the inputs of an exclusive OR gate P1. The output of the exclusive OR gate P1 is connected to the first outputs of two AND gates P2 and P3.

The output of the comparator COMP is connected to one input of an OR gate P4, the second input of which is connected to the output of the AND gate P3. The output of gate P4 is connected to the input D of a D-type flip-flop DBL. The flip-flop DBL has its clock input H connected to the clock circuit CL. Its output Q is connected to the second input of the gate P3, and its reset input R is connected to the output CY of a counter CT1.

The counter CT1 is a seven-bit counter having a clock input H connected to the clock circuit CL. The signal input En is connected to the output of the gate P3. When the gate output En is at a low level, the counter CT1 is set at the counter "8". The outpaut CY of the counter CT1, which corresponds to the counter output 127, is also connected to the second input of the AND gate P2, the output of which is connected to the signal input SYN of a counter CT2.

The counter CT2 is an eight-bit counter, the clock input H of which is connected to the clock CL. When the input SYN of counter CT2 goes to a high level, the counter is reset.

Figure 3:
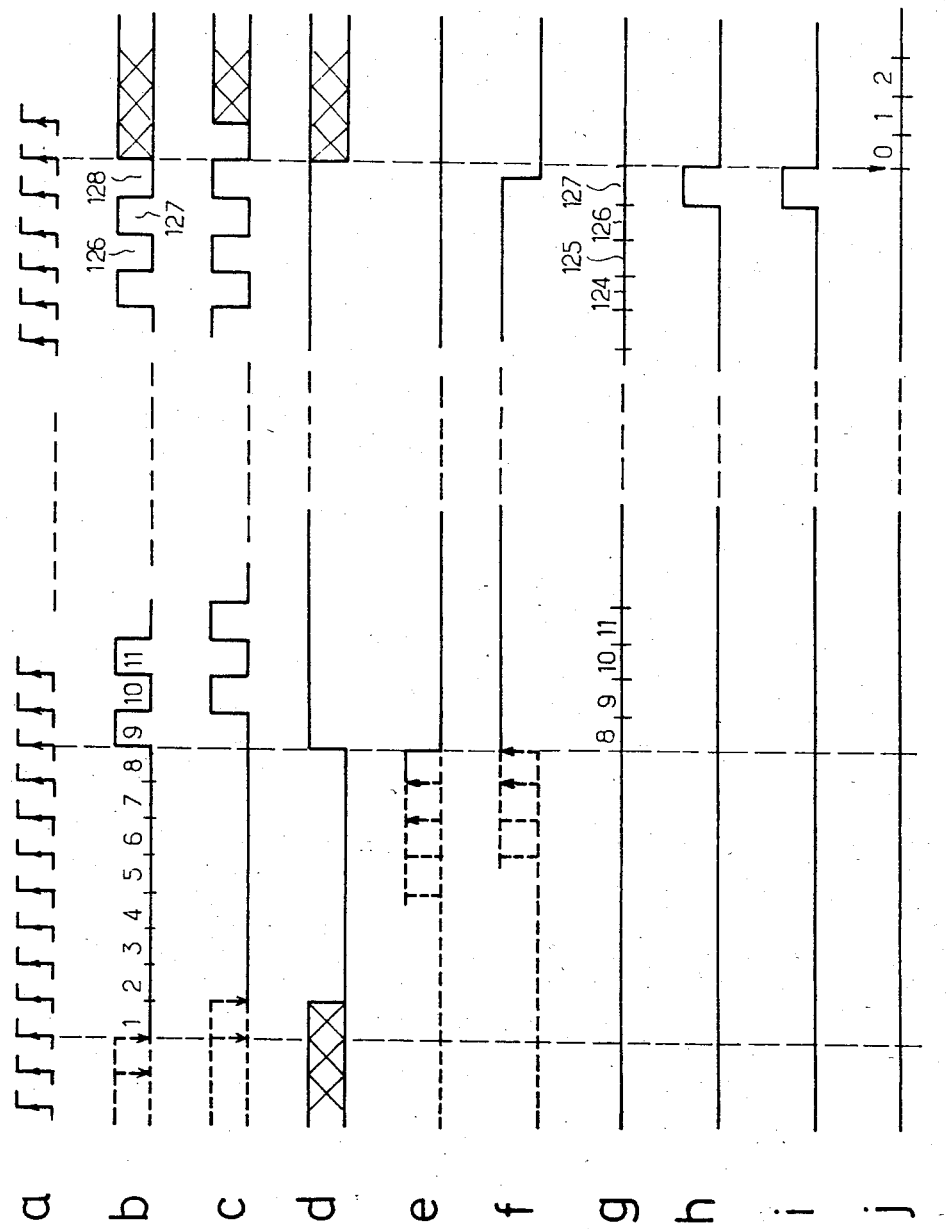
FIGS. 3a to 3j illustrate the waveform of signals at various points of the circuit shown in FIG. 2.

FIG. 3a shows the successive leading edges of the signals supplied by the clock circuit CL.

FIG. 3b depicts the condition of the signal from output "1" of the register RE, when the 128 bits of a blank gating time are received. It will be noticed that since the first eight bits of the gating time are "0"s, the signal remains at a first low level; then, it turns cyclically and alternately from a low level to a high level and vice versa, at the bits of the gating time, from bit slot 9 to bit slot 128.

FIG. 3c depicts the condition of the output signal of the exclusive OR gate P1. It will be noticed that the signal is at a low level during the bit slots 2-8, and remains at a high level after the bit slot 8 since the header is null. Thus, the null header (a "0") has been recognized at the end of time slot 8.

FIG. 3e depicts the condition of the output signal of the comparator COMP. It will be noticed that the signal remains at a low level during from bit slot 9 to bit slot 128.

FIG. 3f depicts the condition of the output signal Q of the flip-flop DBL. It appears that the signal Q is at a high level from bit slot 9 to bit slot 127; then, it goes to a low level at the beginning of bit slot 128.

FIG. 3g shows the counting condition of the counter CT1 which is incremented from 8 to 9 at the transition between bit slots 9 and 10. Then, it is incremented until it reaches 127.

FIG. 3h depicts the condition of the output CY of the counter CT1 which is normally at low level and turns to high level during the bit slot 128.

FIG. 3i depicts the condition of the output of the AND gate P2. It is seen that it corresponds to the condition of the output CY of the counter CT1 if a blank gating time is received.

FIG. 3j depicts the count condition of the divider-by-182 counter CT2 which is reset by the trailing edge of the output signal of the AND gate P2.

The shift register RE ensures that the applied series bit train is delivered in the form of bytes from its outputs, shifting being made at the bit rate of rhythm. The comparator COMP operates and makes the comparison between the byte supplied in parallel from the register RE and the configuration of eight null bits. When the comparison is positive, the comparator COMP supplies a high level pulse (FIG. 3e), that corresponds to the expected presence of a blank gating time header. The pulse delivered from the comparator COMP controls the blank detecting flip-flop DBL, via the OR gate P4. The flip-flop DBL is set to "1". Therefore, the input of the AND gate P3, which is connected to the output Q of the flip-flop DBL, turns to a high level during the 9th bit slot.

On the other hand, up to the 8th bit slot, the output of the exclusive OR gate P1 is at a low level since its inputs are at "0". At the first transition of the received signal, at the beginning of the 9th bit slot, the output of P1 turns to a high level. Thus, at this time, the AND gate P3, which has its two inputs at a high level, supplies a count gating signal to the counter CT1 which was previously locked at "8", as shown by the waveform 3g.

On the other hand, the output signal of the AND gate P3 is delivered to the second input of the OR gate P4. Therefore, when the output of the comparator COMP goes back to a low level at the bit slot 9 (FIG. 3e), the input D of the flip-flop DBL is kept at a high level as long as the output of the gate P1 remains at a high level (FIG. 3d).

If the output of the gate P1 reamins at "1" during 119 clock cycles, as shown in FIG. 3d, the counter CT1 is not reset at any time, and counter CT1 is incremented until it reaches the count 127, at which time it supplies a pulse on its output CY (FIG. 3i).

If the output of the gate P1 is always at "1" at the 128th bit slot, the signal on the output CY is supplied to the AND gate P2. The output signal of the gate P2 rresets the counter CT2 which begins counting again from 0, as shown in FIG. 3j. On the other hand, the signal on the output Cy resets the flip-flop DBL such that the output of the AND gate P3 goes to a low level, which resets the counter CT1 at "8" and a "0" is supplied to the input D of the flip-flop DBL.

In practice, the output signal of the AND gate P2 is used as a synchronizing signal SYN acting on the parallel loading of counter CT2 and framing its counting phase on the time intervals of the receiving line. The framing will continue systematically and cyclically until another blank gating time is received.

If two successive bits of the received message have the same value, before the 128th bit time, the output of the gate P1 goes to a low level as well as the output of the gate P3, the counter CT1 being immediately reset to "8" and locked.

Of course, a "blank gating time" may also be called an "idle time interval."

Those who are skilled in the art will readily perceive how to modify the invention. Therefore, the appended claims are to be construed to cover all equivalent structures which fall within the true scope and spirit of the invention.

What is claimed is:

1. A process for a synchronization of a digital transmission system with a TDM multiplexed group of signals divided into equal and recurrent time intervals, said process comprising the steps of:

(a) transmitting the information divided into data packets, each data packet (A, B or D) having a time span which fills one of said time intervals and including a header (X, Y or Z) which has a fixed length and is followed by the data field.

(b) transmitting an interval synchronizing signal within each idle time interval (C), not carrying a data packet, said interval synchronizing signal having the length of a packet header and not being used as a packet header, and (c) entirely filling the remaining part of the idle interval with a sequence of signals.

2. The process for synchronization according to claim 1, where in the sequence of signals, the remaining part following the synchronizing signal of the interval is a predetermined sequence of bits.

3. The process for synchronization according to claim 2, wherein the synchronization of the TDM multiplexed group of signals is carried out by a proper configuration of the idle time intervals.

4. The process for synchronization according to claim 2 or 3, wherein the sequence of signals for carrying out the synchronizing is a sequence of "0", the following sequence being comprised of alternating "1" and "0".

5. The process for synchronization according to claim 2 or 3, wherein the sequence of signals for carrying out the synchronizing is the sequence "00001111", the following sequence being comprised of alternate "0" and "1" signals.

6. The process for synchronization according to one of the claims 1 to 3, wherein each of said time intervals has a length of sixteen bytes, the header having a length of one byte.

7. The process for synchronization according to claim 4 wherein there are eight prohibited header codes 10101010, 01010101, 00101010, 00010101, 00001010, 00000101, 00000010 and 00000001.

8. The process for synchronization according to claim 5 wherein there are eight prohibited header codes 10101010, 01010101, 00011110, 00111101, 01111010, 11110101, 11101010 and 11010101.

9. A synchronizing circuit for carrying out a process of synchronization according to claim 4, said circuit comprising a first OR gate, an eight-stage shift register having a series input connected to receive a transmission of digital pulse trains and having eight parallel outputs, a comparator means having first inputs connected to the parallel outputs of said register and second inputs which respond to the binary state "0" for applying an output to the first input of said first OR gate, a flip-flop, the output of said first gate being connected to an input of said flip-flop, a first AND gate, an output of said flip-flop being connected to the first input of said first AND gate, a two input exclusive OR gate, the first two parallel outputs of the shift register being also connected to the two inputs of said exclusive OR gate, a second AND gate, the output of said exclusive OR gate being connected to a second input of the first AND gate and to a first input of said second AND gate, first counter means, the output of the first AND gate being connected to a control input of said first counter means, the penultimate output of said first counter means being connected to a reset input of the flip-flop and to a second input of the second AND gate, second counter means, the output of said second AND gate being connected to an initializing input of said second counter means, said second counter means having a cycle duration which is equal to the duration of said time interval, and clock means for driving the register, the flip-flop and the first and second counter means.

10. The process for synchronization according to claim 4, wherein each of said time intervals has a length of sixteen bytes, the header having a length of one byte.

11. The process for synchronization according to claim 5, wherein each of said time intervals has a length of sixteen bytes, the header having a length of one byte.

12. The process for synchronization according to claim 5, wherein there are eight prohibited header codes 10101010, 01010101, 00101010, 00010101, 00001010, 00000101, 00000010 and 00000001.

13. The process for synchronization according to claim 6, wherein there are eight prohibited header codes 10101010, 01010101, 00011110, 00111101, 01111010, 11110101, 11101010 and 11010101.

* * * * *